United States Patent
Philippe et al.

(10) Patent No.: US 10,357,990 B2
(45) Date of Patent: Jul. 23, 2019

(54) METHOD FOR MANUFACTURING A MULTILAYER DATA MEDIUM WITH SECURITY MARKING WHICH CAN BE MARKED BY LASER

(71) Applicant: FASVER, Baillargues (FR)

(72) Inventors: Eric Philippe, Eyguieres (FR); Laurence Bes, Jacou (FR)

(73) Assignee: FASVER (FR)

( * ) Notice: Subject to any disclaimer, the term of this patent is extended or adjusted under 35 U.S.C. 154(b) by 44 days.

(21) Appl. No.: 15/314,658

(22) PCT Filed: Jun. 12, 2015

(86) PCT No.: PCT/EP2015/063201
§ 371 (c)(1),
(2) Date: Dec. 20, 2016

(87) PCT Pub. No.: WO2015/189404
PCT Pub. Date: Dec. 17, 2015

(65) Prior Publication Data
US 2017/0197452 A1    Jul. 13, 2017

(30) Foreign Application Priority Data
Jun. 13, 2014 (FR) ...................... 14 55419

(51) Int. Cl.
*B42D 25/364* (2014.01)
*B41M 5/26* (2006.01)
(Continued)

(52) U.S. Cl.
CPC ............ *B42D 25/364* (2014.10); *B32B 27/08* (2013.01); *B32B 27/304* (2013.01); *B32B 27/36* (2013.01);
(Continued)

(58) Field of Classification Search
CPC .... B42D 25/364; B42D 25/46; B42D 25/455; B42D 25/41; B42D 25/351; B32B 27/304;
(Continued)

(56) References Cited

U.S. PATENT DOCUMENTS

| 5,304,789 A | 4/1994 | Lob et al. |
| 5,928,780 A | 7/1999 | Schmidt et al. |

(Continued)

FOREIGN PATENT DOCUMENTS

| DE | 195 22 397 A1 | 1/1997 |
| EP | 2 407 314 A1 | 1/2012 |

(Continued)

OTHER PUBLICATIONS

International Search Report, dated Aug. 18, 2015, from corresponding PCT application.

*Primary Examiner* — Justin V Lewis
(74) *Attorney, Agent, or Firm* — Levenfeld Pearlstein, LLC

(57) ABSTRACT

Disclosed is a method for manufacturing a multi-layer data medium by hot rolling under pressure, able to be marked under the effect of laser radiation applied to at least one outer surface (11) of this medium, in which at least one marking (13) with optically variable effect is disposed with respect to a laser marking sub-layer so that the outer surface (11) has a portion with optically variable effect optically superimposed on at least one part of the laser marking sub-layer and a portion (16) without marking with optically variable effect optically superimposed on at least one part of the laser marking sub-layer. These portions are produced with contents of at least one marking agent which is sensitive to the laser radiation which are different.

11 Claims, 4 Drawing Sheets

Figure 1:
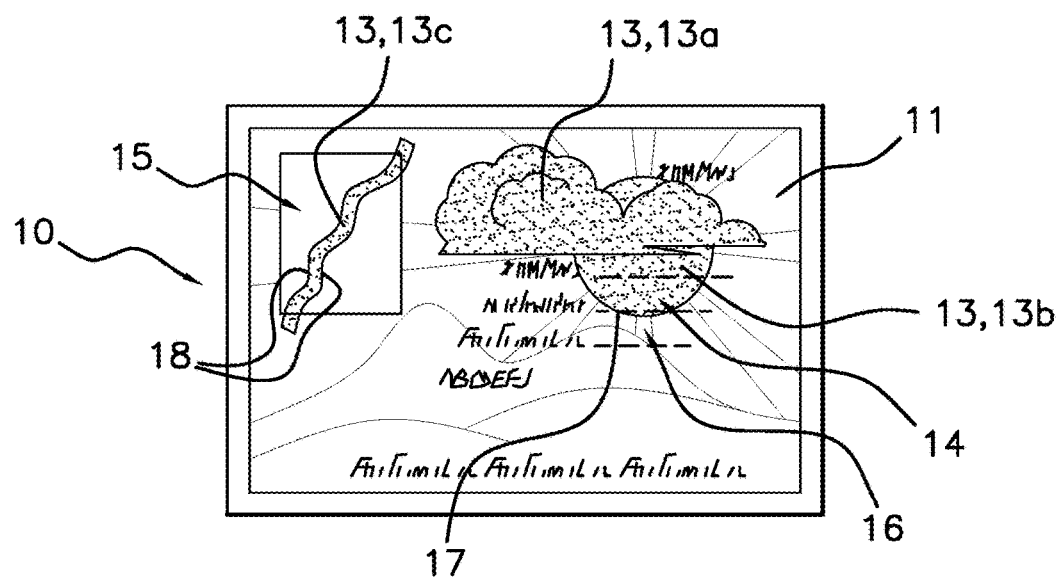

(51) Int. Cl.
  *B41M 3/14*      (2006.01)
  *B32B 37/10*     (2006.01)
  *B42D 25/41*     (2014.01)
  *B42D 25/36*     (2014.01)
  *B42D 25/455*    (2014.01)
  *B42D 25/351*    (2014.01)
  *B42D 25/46*     (2014.01)
  *B32B 27/08*     (2006.01)
  *B32B 27/30*     (2006.01)
  *B32B 27/36*     (2006.01)
  *B32B 38/00*     (2006.01)

(52) U.S. Cl.
  CPC ............ *B32B 27/365* (2013.01); *B32B 37/10* (2013.01); *B32B 38/0008* (2013.01); *B41M 3/148* (2013.01); *B41M 5/267* (2013.01); *B42D 25/351* (2014.10); *B42D 25/36* (2014.10); *B42D 25/41* (2014.10); *B42D 25/455* (2014.10); *B42D 25/46* (2014.10); *B32B 2307/4026* (2013.01); *B32B 2307/412* (2013.01); *B32B 2425/00* (2013.01)

(58) Field of Classification Search
  CPC ..... B32B 38/0008; B32B 37/10; B32B 27/36; B32B 27/365; B32B 27/08; B32B 2425/00; B32B 2307/4026; B32B 2307/412; B41M 3/148; B41M 5/267

USPC ........ 283/67, 72, 74, 84, 85, 86, 87, 94, 98, 283/107, 901
  See application file for complete search history.

(56) References Cited

U.S. PATENT DOCUMENTS

| | | | |
|---|---|---|---|
| 6,693,657 | B2 | 2/2004 | Carroll, Jr. et al. |
| 7,252,239 | B2 | 8/2007 | Braun |
| 2007/0295689 | A1 | 12/2007 | Clauss et al. |
| 2009/0243278 | A1* | 10/2009 | Camus ................ D21H 21/48 283/72 |
| 2011/0226147 | A1 | 9/2011 | Trantoul et al. |
| 2012/0141814 | A1* | 6/2012 | Petzoldt ................ C09D 4/00 283/72 |
| 2012/0263893 | A1* | 10/2012 | Endres ................ G02B 5/208 428/29 |

FOREIGN PATENT DOCUMENTS

| | | |
|---|---|---|
| EP | 2 465 701 A2 | 6/2012 |
| EP | 2 465 703 A2 | 6/2012 |
| FR | 2 987 554 A1 | 9/2011 |
| WO | 2004/050766 A1 | 6/2004 |
| WO | 2004/050767 A1 | 6/2004 |
| WO | WO2006/042714 A1 | 12/2007 |

\* cited by examiner

METHOD FOR MANUFACTURING A MULTILAYER DATA MEDIUM WITH SECURITY MARKING WHICH CAN BE MARKED BY LASER

The invention relates to a method for manufacturing a multi-layer data medium by hot rolling under pressure of a stack of a plurality of superimposed layers comprising at least one layer made of at least one thermoplastic material, able to be marked under the effect of laser radiation applied to at least one outer surface of this medium, and comprising at least one security marking with optically variable effect. It relates to the medium thus obtained, to the use thereof for the manufacture of an official document, and to an official document thus obtained.

Official documents are documents which, by reason of their nature and/or the rights which they can confer, must be protected against attempted forgery and/or counterfeiting and/or to guarantee authentication and/or to guarantee the integrity thereof (i.e. the fact that they have not been tampered with or modified). These documents can be in particular passports, visas, identity cards, driving licences, vehicle registration cards (logbooks), bank cards, loyalty cards, bank cheques, diplomas, certificates, transport documentation, access control cards, badges, labels, legal documents, contracts, legal registers, land registry documents, trust documents, bank notes, manufacturing drawings or other drawings . . . . Official documents have markings, such as variable personalising details (surname, first name, address, photo, signature . . . of a holder or parties . . . ) and/or common details (security patterns, matrices, borders, field names, seals, holograms, signatures, values, . . . ).

Throughout the text, the term "visible" designates any electromagnetic radiation of which the spectral composition is within the wavelength spectrum visible to the human eye, i.e. within wavelengths between 0.4 µm and 0.8 µm.

Throughout the text, "marking" designates any sign or pattern produced on a layer of a document and able to be read by a human and/or a machine (OCR), at least under certain conditions (in particular under normal lighting with visible light; and/or under specific lighting; and/or after activation of an electronic device (screen) or the like . . . ). This may include, in particular, variable personalising details (surname, civil status, photograph, value, dates . . . ) of a official document or common and/or security details; texts (manually written or printed characters); codes (ASCII, universal codes which are read optoelectronically such as bar codes . . . ); holograms, designs, images or photographs; spots or blocks of colour . . . . Official documents generally contain security markings, to render reproduction or forgery thereof impossible or extremely complex. These security markings can be of the type which are visible in the visible range by simply looking with the naked eye (first-level security); or of the type which can be checked using a specific device such as an ultraviolet lamp (second-level security); or of the type which can be checked only in a certified laboratory (third-level security).

Throughout the text, "optically variable effect" designates any marking producing visual aspects—particularly but not exclusively in the visible range—(e.g. different colours or different tones) which vary depending on the directions from which this marking is viewed. In particular, this marking may be marking by interferential and/or iridescent pigments, or with liquid crystal inks or the like.

Throughout the text, the term "optically superimposed" designates layers or portions of layers disposed facing one another such that a ray of light passing through one of them passes through the others. Two layers or portions of layers which are optically superimposed can be physically superimposed in contact with one another, or separated by separating layers or portions of separating layers.

Throughout the text, "paper" designates any sheet obtained by a wet method using a suspension of natural cellulose fibres and/or mineral fibres and/or vegetable fibres and/or polymeric synthetic fibres other than cellulose, able to contain various fillers and additives such as are used in paper-making. The term "synthetic paper" designates any paper comprising polymeric synthetic fibres other than cellulose.

Throughout the text, the expression "at least substantially" indicates, in a conventional manner, that a structural or functional feature should not be understood to be marking a sudden discontinuity, which would have no physical meaning, but covers not only this structure or this function but also slight variations in this structure or this function which, in the technical context in question, produce an effect of the same nature, if not of the same degree. Moreover, the expressions "including/comprising a/one" are synonyms for "including/comprising at least one".

Numerous official documents such as bank cards, identity cards, driving licences, cards for individual access to sites or public transport, passport pages, customs documents, visas, trust documents, bank notes . . . are formed of multi-layer data media obtained by hot rolling (temperature typically of the order of 150° C. to 200° C.) under pressure (typically of the order of $10^6$ Pa to $2 \cdot 10^6$ Pa) of a plurality of layers of thermoplastic material—in particular of polycarbonate, a material also having numerous advantages in these applications (rigidity, durability, easy and reliable marking (variable inscriptions, security patterns . . . ), option to produce markings by laser radiation . . . ).

From an industrial point of view, it is important to be able to mass manufacture these data media, incorporating therein all the markings constituting the common details and all the security elements in order to be able, in a final step generally implemented at a specific site, to effect personalisation by marking under the effect of laser radiation permitting variable details to be inserted in each data medium.

In order to permit such final personalising marking by laser radiation, the data medium incorporates a laser marking sub-layer which is sensitive to laser radiation, i.e. producing a marking under the effect of the laser radiation, either owing to the fact that it comprises at least one compound such as carbon black (cf. e.g. U.S. Pat. No. 7,252,239) or that it can be etched by laser radiation (partial ablation in the thickness thereof by vaporisation as described e.g. by EP2407314).

The laser marking sub-layer is protected by one or a plurality of covering layers incorporating security markings (common details) for aesthetic purposes and/or to protect the laser marking sub-layer from mechanical or chemical attack. Each covering layer is applied on one side of the laser marking sub-layer during the process of manufacturing the medium by hot rolling under pressure, before effecting the laser marking itself, which is carried out through the thickness of each covering layer.

U.S. Pat. No. 5,304,789 thus describes a multi-layer data medium in the form of a card comprising a laser marking sub-layer which is sensitive to non-visible laser radiation forming a second level of security (camouflaged by a layer which appears black in the visible range which can be the laser marking sub-layer itself), a covering layer which is transparent to the electromagnetic radiation of the laser, and a contrasting opaque basic layer. The covering layer can itself be slightly sensitive to laser radiation. Imprinting or films containing iridescent pigments can be disposed above the laser marking sub-layer in order to produce a pleasing aesthetic effect. The laser marking sub-layer can extend over just a surface portion in a pattern which itself forms a marking, another portion of the outer surface of the data medium having imprinting which can be seen in visible light.

On the other hand, US 2012/263893 describes a multi-layer data medium comprising a marking layer which is sensitive to laser radiation, a thermochromic covering layer above the marking layer as well as an optically variable layer above the thermochromic covering layer, it being possible to produce a laser marking in the marking layer through the thermochromic covering layer and the optically variable layer.

It is important that the markings of an official document can be read and deciphered easily and reliably by a person and/or by a reading device (scanner) provided with character recognition software (OCR). However, the inventors have determined that this was not the case with some relative configurations of security markings and of the personalising laser markings. Furthermore, these configurations are extremely advantageous in terms of security.

It should also be noted in this regard that it is important that the laser radiation used for the personalising marking can be applied without necessitating complex settings and adjustments and can, on the contrary, be implemented in a standardised manner, without setting e.g. with a constant-intensity 1064 nm infrared laser. In fact, it must be possible to produce the personalising markings of official documents rapidly and at a high rate under the control of administrations which are simple users of laser marking devices. It is thus best to avoid having to effect adjustments and settings on this device depending on the possible security markings which may be present on the data media and especially during a single step of personalising marking of a document.

The invention thus aims to overcome these disadvantages by proposing a method of manufacturing a multilayer data medium which is hot rolled under pressure, and a data medium thus obtained, permitting a high level of security to be achieved in the protection of the laser markings produced in a final personalising step.

The invention aims more particularly to allow partially overlapping configurations of a marking with optically variable effect with a laser marking while achieving a high quality in the laser marking so that these markings can be read and deciphered easily and reliably to an equal degree by a person and by a reading device provided with character recognition software.

The invention also aims to provide a data medium permitting such personalising laser marking to be produced rapidly and at a high rate without necessitating any adjustment or setting of the laser during each laser marking step or in dependence upon the possible security markings which may be present on the data medium.

In order to do so, the invention relates to a method for manufacturing a multi-layer data medium by hot rolling under pressure of a stack of a plurality of superimposed layers comprising at least one layer made of at least one thermoplastic material, able to be marked under the effect of laser radiation applied to at least one outer surface of this data medium, wherein:

at least one layer, named covering layer, which is transparent to marking laser radiation is placed covering a layer, named laser marking sub-layer, sensitive to this laser radiation, so as to permit the production of a marking in the marking sub-layer under the effect of this laser radiation passing through each covering layer, at least one marking with optically variable effect is incorporated in at least one covering layer, at least one marking agent which is sensitive to said laser radiation is incorporated in at least one covering layer, characterised in that:

each marking with optically variable effect is disposed with respect to the laser marking sub-layer so that said outer surface has a portion with optically variable effect optically superimposed on at least one part of the laser marking sub-layer and a portion without marking with optically variable effect optically superimposed on at least one part of the laser marking sub-layer, said portion without marking with optically variable effect and said portion with optically variable effect are produced with contents of at least one marking agent which is sensitive to said laser radiation, between said outer surface of the medium and said laser marking sub-layer, which are different.

The invention also relates to a multi-layer data medium comprising at least one layer made of at least one thermoplastic material, able to be marked under the effect of laser radiation applied to at least one outer surface of this data medium, comprising:

at least one layer, named covering layer, which is transparent to marking laser radiation placed covering a layer, named laser marking sub-layer, sensitive to this laser radiation, so as to permit the production of a marking in the marking sub-layer under the effect of this laser radiation through each covering layer, at least one marking agent with optically variable effect visible from said outer surface, at least one marking which is sensitive to said laser radiation in at least one covering layer, characterised in that:

said outer surface has a portion with optically variable effect optically superimposed on at least one part of the laser marking sub-layer and a portion without marking with optically variable effect optically superimposed on at least one part of the laser marking sub-layer, said portion without marking with optically variable effect and said portion with optically variable effect have compositions of at least one marking agent which is sensitive to said laser radiation, between said outer surface of the medium and said laser marking sub-layer, which are different.

The inventors have determined, in contrast to the teaching of the prior art, that a covering layer and a marking with optically variable effect which cover the laser marking sub-layer are not totally permeable and transparent to the marking laser radiation, and, on the contrary, have variable sensitivities in partially absorbing the laser radiation. The inventors have also determined that this absorption is highly variable depending on the different compositions of covering layers and markings with optically variable effect which are used. In particular, in contrast to indications in the earlier documents cited above, it appears that the majority of the interferential pigments interact with marking laser radiation and that this interaction depends in particular on the colour of the pigments. This not only results in an inappropriate marking superimposed on the marking with optically variable effect but also and especially in an attenuation, which can be considerable, in the external appearance of the laser marking.

By variation of the content (nature and/or proportion) of marking agent(s) sensitive to said laser radiation and incorporated into at least one covering layer (in the thickness zone between said outer surface of the medium and said laser marking sub-layer), between the portion with optically variable effect and the portion without marking with optically variable effect, the invention makes it possible to overcome these problems by obtaining personalising laser marking of excellent quality, perfectly contrasted and able to be rendered at least substantially homogeneous.

The portion with optically variable effect can be formed of a single part (as a block of colour on a surface part of the outer surface) or of a plurality of distinct parts, which are contiguous or separate (a plurality of adjacent or separated patterns). Whatever the case may be, the outer surface is not entirely covered by a block of colour with optically variable effect and has at least one separation between at least one marking with optically variable effect and a portion without marking with optically variable effect.

A data medium in accordance with the invention thus makes it possible to produce laser marking overlapping at least one separation between the portion with optically variable effect and the portion without marking with optically variable effect, this laser marking being able to be rendered homogeneous or in any case perfectly readable by a person or by a reading device despite the presence of this separation.

Thus in an advantageous manner and in accordance with the invention, each marking with optically variable effect is disposed with respect to the laser marking sub-layer so that said laser marking sub-layer extends facing at least one separation between the portion with optically variable effect and the portion without marking with optically variable effect.

Furthermore, in an advantageous manner and in accordance with the invention said compositions made of at least one marking agent which is sensitive to said laser radiation are selected so that the laser marking obtained under the effect of said laser radiation, as appearing from said outer surface, is at least substantially homogeneous over the whole of the outer surface including on both sides of each separation between the portion with optically variable effect and the portion without marking with optically variable effect.

The invention thus makes it possible to obtain personalising laser marking of excellent quality and perfectly contrasted although this personalising laser marking can be partially covered by an optically variable marking and thus covered by a separation limit of such a marking. It should be noted in this respect that the fact that at least one separation between the portion with optically variable effect and the portion without marking with optically variable effect covers a personalising laser marking produced in the laser marking sub-layer makes it possible to considerably increase the security provided by the marking with optically variable effect (with respect to a simple block of colour which covers the whole of the laser marking which is much easier to remove and reproduce).

In some embodiments, in an advantageous manner and in accordance with the invention, said portion without marking with optically variable effect is without any marking agent which is sensitive to said laser radiation, at least one marking agent which is sensitive to said laser radiation being incorporated into at least one covering layer only in said portion with optically variable effect. The content of at least one marking agent which is sensitive to said laser radiation in each covering layer facing said portion with optically variable effect is selected so that the laser marking in the laser marking sub-layer then produces, as seen from the outer surface through said portion with optically variable effect, an effect corresponding—in particular at least substantially identical—to the effect produced as seen from the outer surface through said portion without marking with optically variable effect. In these embodiments, said content of at least one marking agent which is sensitive to said laser radiation facing said portion without marking with optically variable effect thus consists of an absence of marking agent which is sensitive to said laser radiation.

In one variation there is no reason not to make provision for at least one covering layer also to comprise at least one marking agent which is sensitive to said laser radiation facing said portion without marking with optically variable effect, the content of at least one marking agent which is sensitive to said laser radiation facing said portion without marking with optically variable effect thus being different to that facing said portion with optically variable effect.

In some embodiments, in an advantageous manner and in accordance with the invention, at least one covering layer incorporating at least one marking agent which is sensitive to said laser radiation and at least one covering layer comprising at least one marking with optically variable effect are optically superimposed. In some of these embodiments, the adjustment of the content of at least one marking agent which is sensitive to laser radiation is carried out by adding an additional layer, which is dedicated to this adjustment and optically superimposed, on the side of the laser marking sub-layer or preferably on the side of the outer surface, to at least one covering layer comprising at least one marking with optically variable effect.

In a variation or in combination, in some embodiments of the invention, at least one marking agent which is sensitive to said laser radiation is incorporated in at least one covering layer comprising at least one marking with optically variable effect. Thus, a single covering layer can comprise both a marking with optically variable effect and a marking agent which is sensitive to said laser radiation permitting the contrast of said laser marking to be enhanced.

Any marking agent which is sensitive to marking laser radiation can be used in a method and a data medium in accordance with the invention. Each marking agent which is sensitive to laser radiation and incorporated in a covering layer of a data medium in accordance with the invention is preferably selected to obtain a marking which is at least substantially of the same nature (colour, shade, intensity . . . ) as that produced by the laser marking sub-layer. In particular, when the marking produced by the laser marking sub-layer is dark and/or black marking, each marking agent which is sensitive to laser radiation and incorporated in a covering layer is selected to produce a marking which is also dark and/or black.

In an advantageous manner, in a method in accordance with the invention, each covering layer and the laser marking sub-layer are hot rolled under pressure after production of each marking with optically variable effect. Typically, when the various constituent layers of said data medium are mainly constituted by polycarbonate, the hot rolling under pressure is carried out at a temperature higher than 120° C., in particular of the order of 150° C. to 200° C.; and at a pressure higher than $10^6$ Pa, in particular of the order of $2 \cdot 10^6$ Pa.

On the other hand, the laser marking is carried out by application of the laser radiation to the outer surface of the data medium after said hot rolling under pressure, in particular as a final personalising marking step at a specific site permitting an official document to be obtained.

Numerous different embodiments can relate to the incorporation of at least one marking with optically variable effect in at least one covering layer. In an advantageous manner and in accordance with the invention, at least one marking with optically variable effect is imprinted using an ink composition on at least one surface of a covering layer made of thermoplastic material which is then hot rolled under pressure conjointly with the other constituent layers of the data medium. Any imprinting technique can be used to this effect, in particular one selected from screen printing, photogravure, flexography, offset printing or the like. The ink composition comprises at least one agent producing an optically variable effect, in particular selected from among iridescent pigments, interferential pigments and liquid crystals.

Different variations can be envisaged with respect to the wavelengths of the marking laser radiation and of visibility or observation of the different markings, in particular depending on the nature of the laser marking and the desired level of security (first, second or third level). In some embodiments, a data medium in accordance with the invention is advantageously characterised in that each covering layer is transparent in the visible range of wavelengths, and in that the laser marking sub-layer is adapted to produce marking in the visible range of wavelengths under the effect of said laser radiation.

The invention relates to an official document comprising a data medium in accordance with the invention, of which at least one outer surface has at least one laser marking—in particular, a personalising laser marking. It relates in particular to an official document formed by a data medium in accordance with the invention having undergone a laser marking—in particular, a personalising laser marking.

In some advantageous embodiments, an official document in accordance with the invention is also characterised in that at least one laser marking is optically superimposed on at least one separation between at least one marking with optically variable effect and the portion without marking with optically variable effect, and in that said laser marking is at least substantially homogeneous as seen from said outer surface.

An official document in accordance with the invention can in particular be selected from the group formed by passports, passport pages, customs documents, visas, identity cards, driving licences, vehicle registration cards (logbooks), bank cards, loyalty cards, bank cheques, diplomas, certificates, transport documentation, access control cards, badges, labels, legal documents, contracts, legal registers, land registry documents, trust documents, bank notes, packages and manufacturing drawings.

The invention also relates to a method for manufacturing, a data medium and an official document, which are characterised in combination by all or some of the features mentioned above or below.

Figure 2:
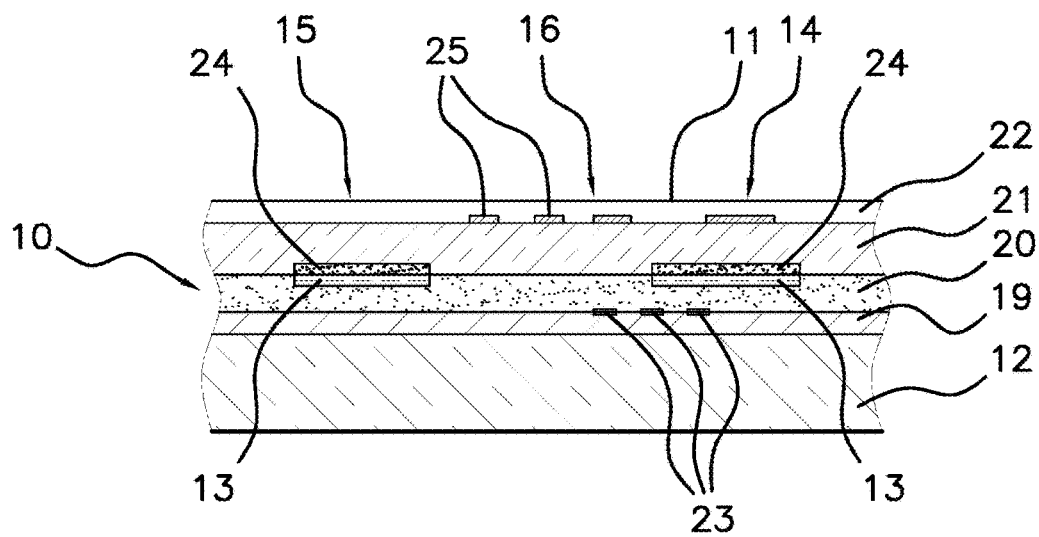
Figure 3:
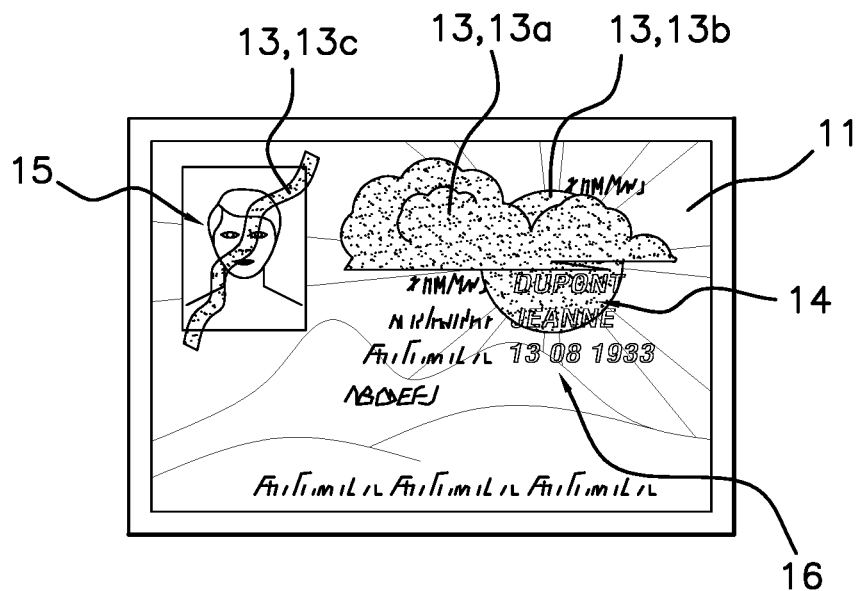
Figure 4:
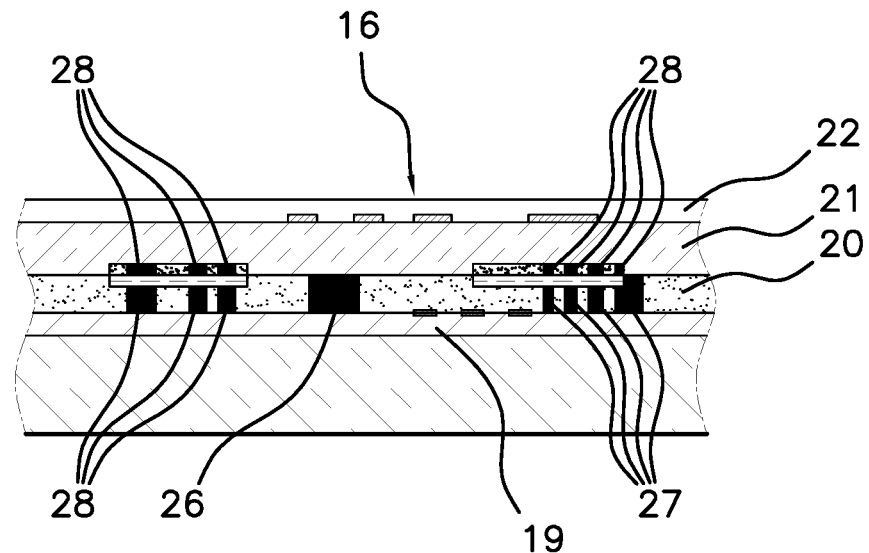
Figure 5:
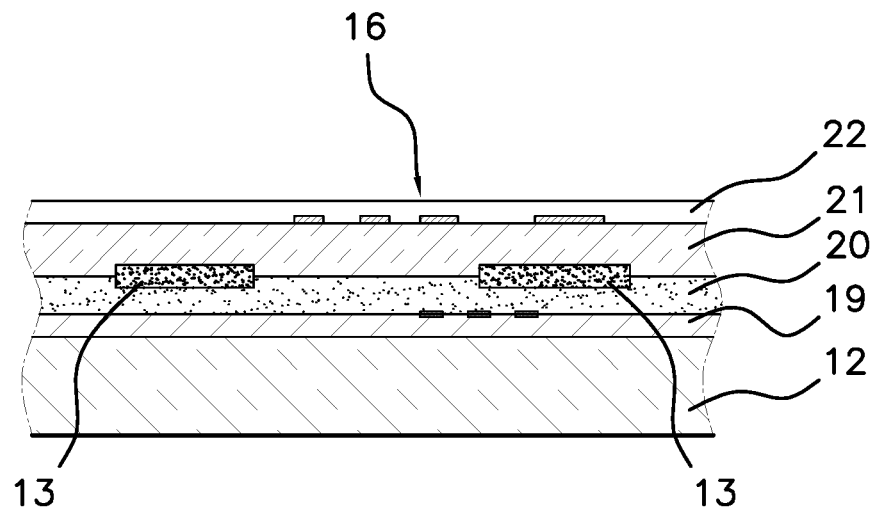
Figure 6:
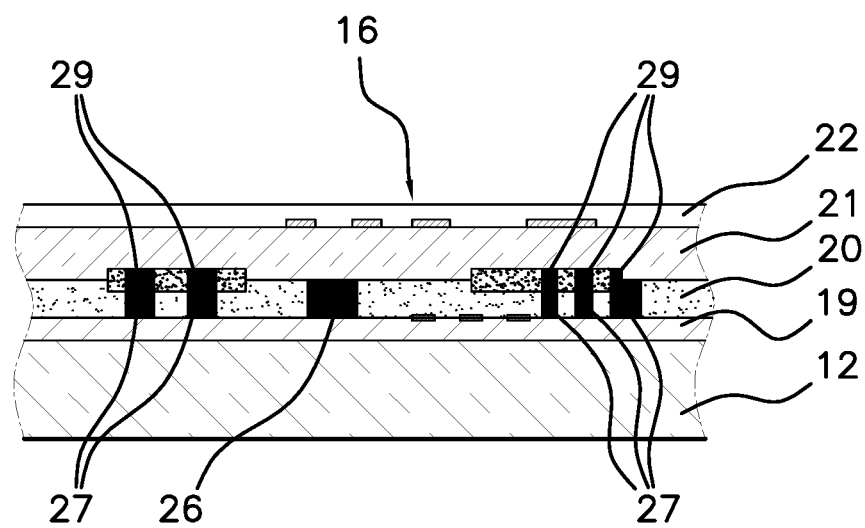
Figure 7:
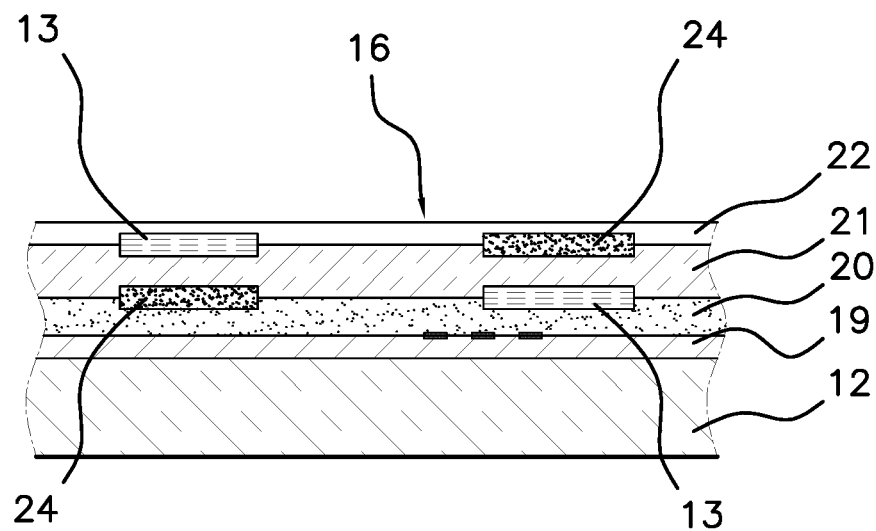
Figure 8:
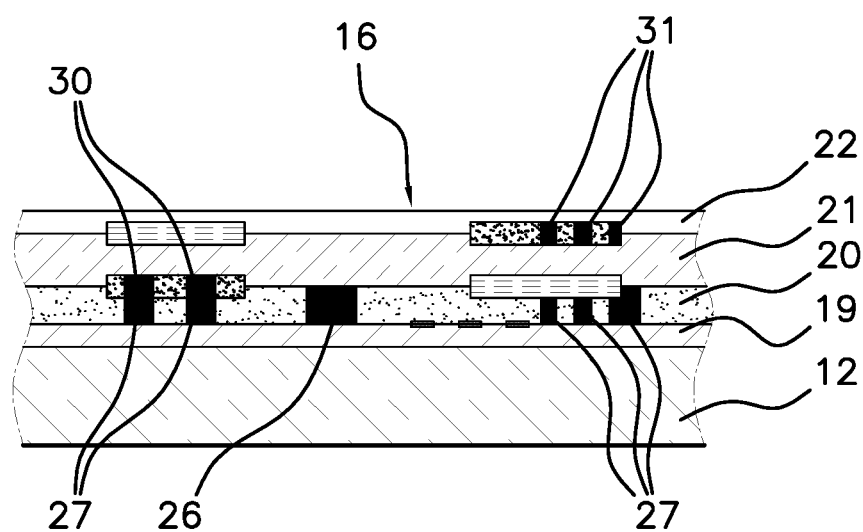
Figure 1:
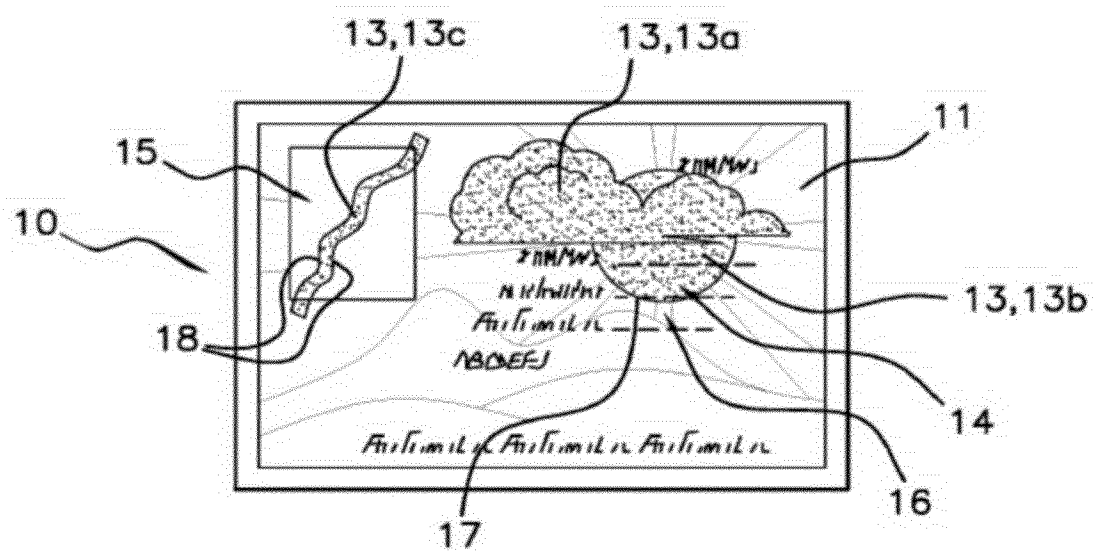
Figure 2:
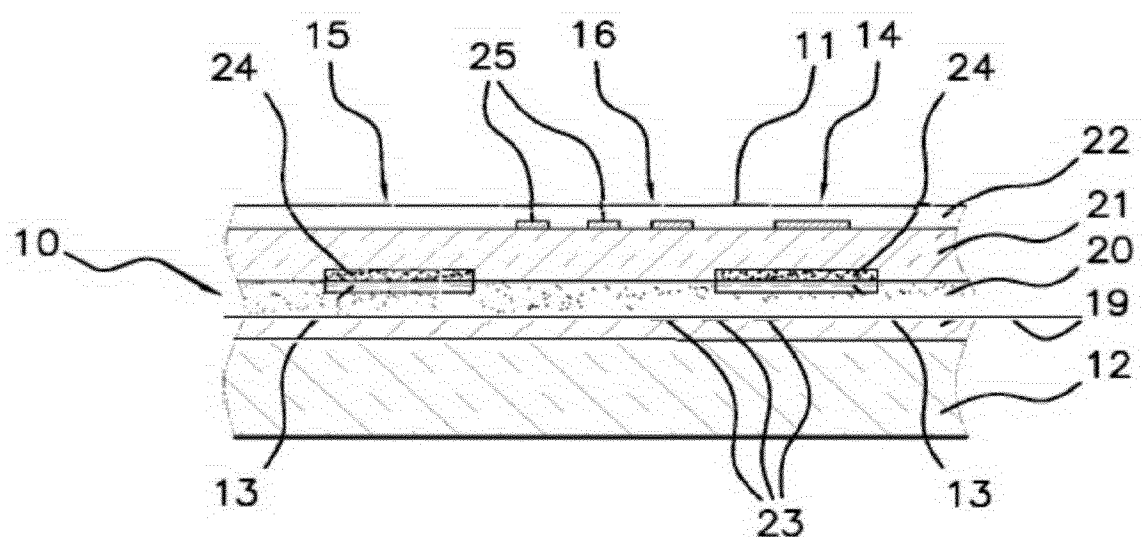
Figure 3:
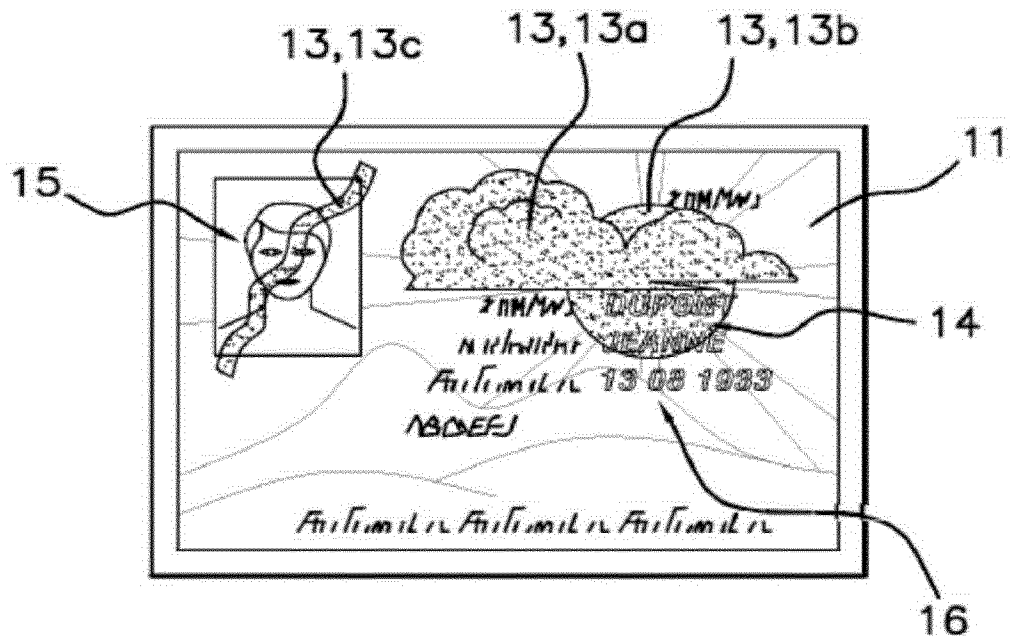
Figure 4:
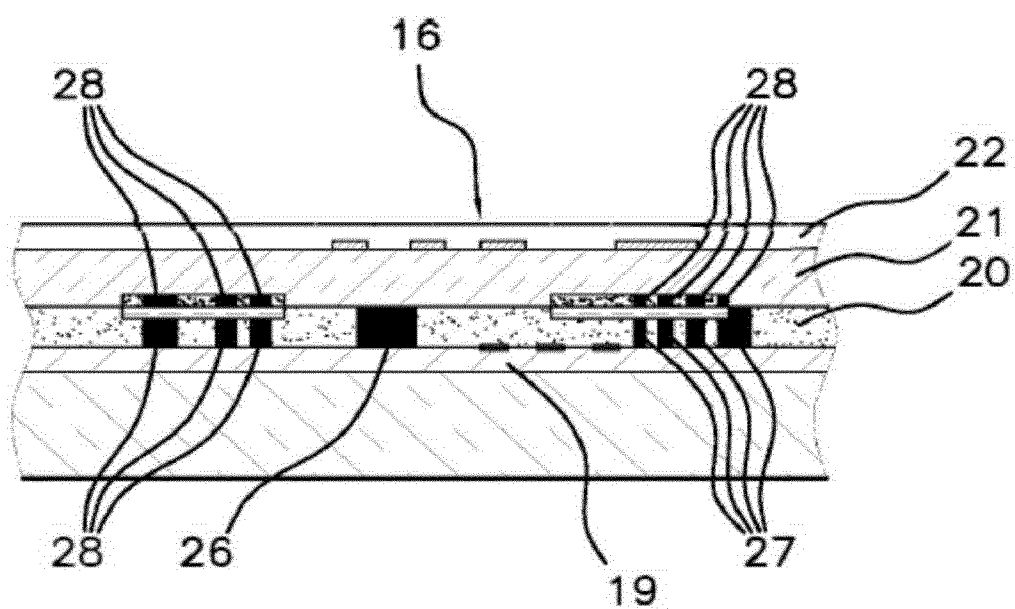
Figure 5:
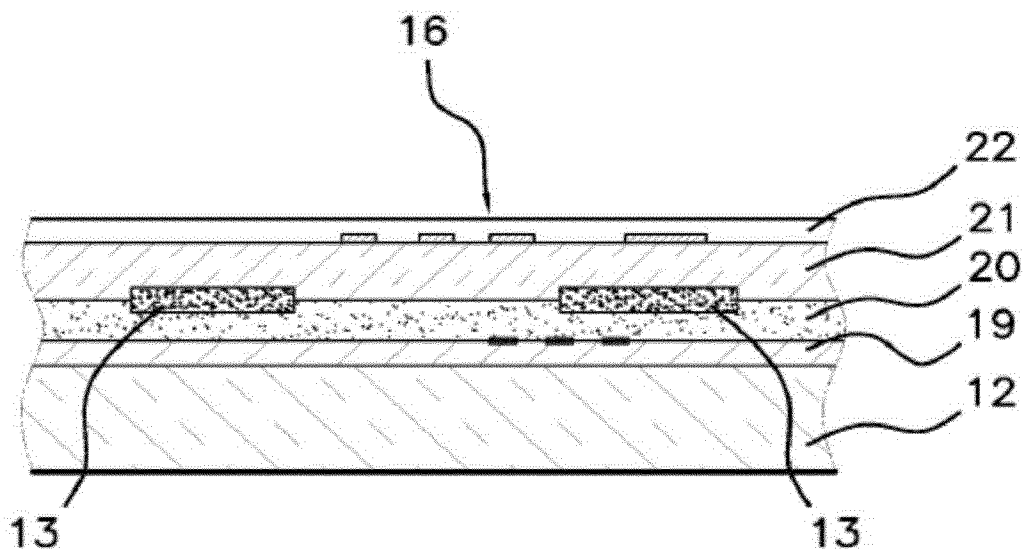
Figure 6:
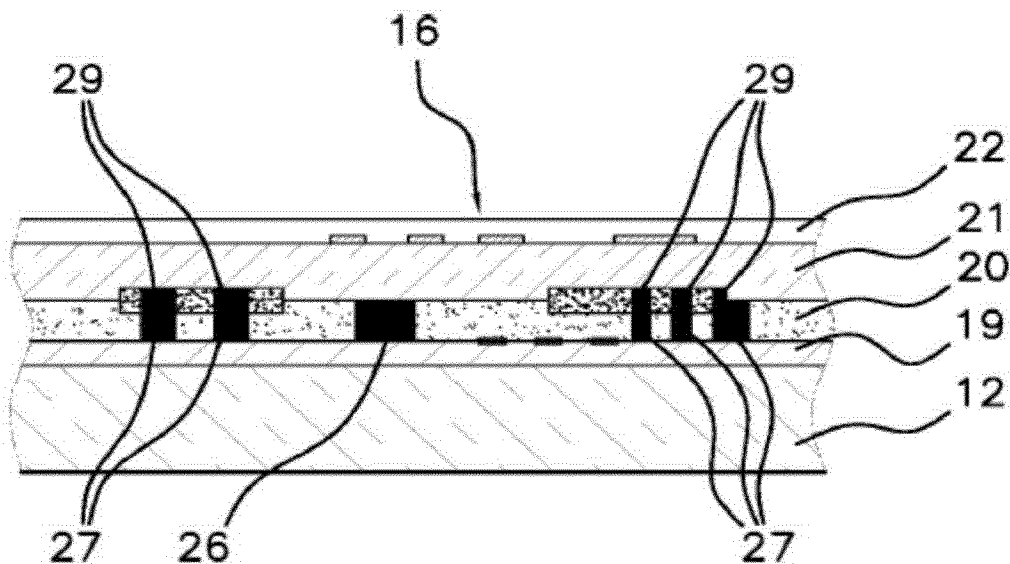

Other aims, features and advantages of the invention will become clear upon reading the following description of different embodiments of the invention given in a non-limiting manner and referring to the attached figures in which:

FIG. 1 is a schematic top view of an example of a data medium in accordance with the invention, FIG. 2 is a schematic partial view in cross-section of a data medium in accordance with a first embodiment of the invention, FIG. 3 is a schematic top view of an example of an official document in accordance with the invention obtained after laser marking of the data medium of FIG. 1, FIG. 4 is a schematic partial view in cross-section of an official document in accordance with the invention obtained after laser marking of the data medium of FIG. 2, FIG. 5 is a schematic partial view in cross-section of a data medium in accordance with a second embodiment of the invention, FIG. 6 is a schematic partial view in cross-section of an official document in accordance with the invention obtained after laser marking of the data medium of FIG. 5, FIG. 7 is a schematic partial view in cross-section of a data medium in accordance with a third embodiment of the invention, FIG. 8 is a schematic partial view in cross-section of an official document in accordance with the invention obtained after laser marking of the data medium of FIG. 7.

In the figures, for the sake of illustration, the relative scales and dimensions have not been respected. In particular, in FIGS. 2, 4 and 5 to 8, the thicknesses are shown in an exaggerated manner.

FIG. 1 shows an example of a data medium 10 in accordance with the invention, ready for use, being suitable for undergoing personalising laser marking in order to obtain an official document in accordance with the invention. This data medium 10 is formed of a stack of a plurality of layers superimposed one on another and having been subjected to hot rolling under pressure. The majority, or even the totality, of the layers are preferably formed of a thermoplastic material, in particular selected from among polycarbonates, PVCs, polyesters (polyethylene terephthalate PET, polyethylene terephthalate glycol PETG), co-extruded films of polyester and polycarbonate (PEC), synthetic papers and mixtures and associations thereof. In some advantageous embodiments, in particular for applications of the bank card, identity card or transport card type, the data medium 10 is formed of a plurality of polycarbonate layers. There is nothing to prevent the data medium incorporating layers of different materials, including layers of a material other than a thermoplastic material e.g. paper. The total number of layers making up a data medium 10 in accordance with the invention is of no significance within the scope of the present invention.

The data medium 10 is in the general form of a sheet or card and thus has two opposing planar outer main surfaces and a relatively small thickness. Throughout the following, only one main surface, named outer surface 11, is described and has the features of the invention, it being understood that the other main surface can equally have the same features or, on the contrary, can have other features. Consequently, it is assumed throughout the following that the surface opposite the outer surface 11 in question is an outer main surface of a base 12 illustrated in the figures in cross-section, without this implying any limitation whatsoever, such a base 12 possibly not being present and/or itself being formed of a layer or a plurality of layers of various thicknesses, not described in this description.

In particular, the base 12 can be formed of at least one layer of thermoplastic material selected from among polycarbonates, PVCs, polyesters (polyethylene terephthalate PET, polyethylene terephthalate glycol PETG), co-extruded films of polyester and polycarbonate (PEC), synthetic papers (in particular selected from among the paper sold under the trade mark Teslin® by the company PPG, Monroeville, USA, the paper sold under the trade mark Neobond® by the company Neenah Lahnstein, Lahnstein, Germany, and the paper sold under the trade mark Polyart® by the company Arjobex, Boulogne, France) and mixtures and associations thereof. Other examples are possible.

The outer surface 11 of the data medium 10 has different markings representing information (common details) and/or constituting security markings intended to reinforce resistance to attempted forgery and/or to prevent reproduction by optical reading. The data medium 10 comprises in particular at least one marking 13 with optically variable effect, i.e. in the illustrated example, a marking 13a in the form of a cloud, a marking 13b in the form of a sun overlapping a location 14 intended to receive personalising text (surname, first name . . . ) by laser marking, and a marking 13c in the form of an undulating strip passing through a location 15 intended to receive an identifying photograph by laser marking. Since the data medium 10 is not personalised at the locations 14, 15, these are in particular not filled in with variable details.

The markings 13 with optically variable effect can be formed by imprinting with an ink with interferential pigments and/or by imprinting with an ink with iridescent pigments and/or by imprinting with an ink with liquid crystal pigments. The markings 13 with optically variable effect do not cover the whole of the outer surface 11, the latter thus having a portion provided with these markings 13 with optically variable effect and another portion 16 without marking with optically variable effect. It should be noted that the location 14 which is intended to receive personalising text extends in an optically superimposed manner with at least one 13 of the markings with optically variable effect and with at least one part of said portion 16 without marking with optically variable effect. Thus the marking 13b with optically variable effect representing a sun is defined by a lower edge 17 which forms a separation between this marking 13b with optically variable effect and the portion 16 without marking with optically variable effect, and this separating edge 17 is optically superimposed on the location 14 intended to receive personalising text by laser marking. Similarly, the markings 13c with optically variable effect representing a strip have lateral edges 18 forming separations between this marking and the portion 16 without marking with optically variable effect, and these lateral edges 18 being optically superimposed on the location 15 intended to receive an identifying photograph by laser marking.

The markings 13 with optically variable effect can be produced e.g. in at least one step of imprinting with an imprinting composition comprising a pigment selected from the group formed by green interferential pigments (Xirallic®, T60-24SW, stellar green, sold by the company Merck, Dramstadt, Germany), blue interferential pigments (Xirallic® T60-23SW, galaxy blue sold by the company Merck, Dramstadt, Germany), red interferential pigments (Xirallic®, T60-21SW, solaris red sold by the company Merck, Dramstadt, Germany), and yellow interferential pigments (Xirallic® T60-20SW, sunbeam gold sold by the company Merck, Dramstadt, Germany).

The invention makes it possible to take into account the fact that, contrary to what is indicated by the prior art, personalising laser marking carried out through a marking 13 with optically variable effect does not have the same features as personalising laser marking carried out through a portion 16 without marking with optically variable effect. In fact, the markings 13 with optically variable effect mostly produce a relatively large attenuation of the laser marking, an attenuation which itself varies according to the features of the marking 13 with optically variable effect, in particular according to the nature of the pigments used and the colour thereof.

In the embodiment illustrated in FIG. 2, the data medium 10 comprises, starting from the base 12:

a basic layer 19 which can be formed e.g. by an opaque white block of colour (contrasting with all the coloured, dark or black inscriptions optically superimposed on this basic layer 19 on the side of the outer surface 11), a laser marking sub-layer 20 which is sensitive to marking laser radiation, in particular infrared laser radiation e.g. at 1064 nm, so as to permit the production of a marking in at least one part of the thickness of this laser marking sub-layer 20 under the effect of this laser radiation applied from the outer surface 11, a first covering layer 21 placed overlapping and in contact with the whole of the surface of the laser marking sub-layer 20, a second covering layer 22 acting as protection applied above the first covering layer 21 and thus also overlapping the laser marking sub-layer 20, i.e. optically superimposed on this latter sub-layer. The outer surface 11 is formed by the last covering layer 22.

The laser marking sub-layer 20 can extend in the form of a continuous block of colour in the format of the outer surface 11 (except for possible peripheral shrinkage); or, in contrast, it can be applied in the form of a plurality of distinct, separate portions, at least facing the locations 14, 15 intended to receive laser marking, or only facing these locations 14, 15. It can be formed with a thickness of varnish imprinted with an ink composition incorporating a marking agent which is sensitive to laser radiation e.g. one selected from the group comprising 95 nm nanonized carbon black sold under the name lamp black 101 by the company Degussa, Essen, Germany, the additives described in WO2004/50766 and WO2004/50767, the additives sold under the trade mark Micab® by the company DSM, Heerlen, Netherlands, the mica (silicate) particles covered with antimony-doped tin oxide as described in DE19522397, the additives sold under the trade mark IRIOTEC series 8000® by the company Merck, Dramstadt, Germany, a powder of calcined mixed oxides of co-precipitates of tin and antimony as described in U.S. Pat. No. 6,693,657, the additives sold under the trade mark Mark-it® by the company BASF, Ludwigshafen, Germany, and the mixed oxides of copper or tin containing phosphorus which are described in WO2006/042714. This being the case, the invention applies to all the possible embodiments of such a laser marking sub-layer 20 since it is able to produce contrasted, dark, black or possibly coloured marking under the effect of the laser radiation. In particular, there is nothing to prevent the laser marking sub-layer 20 itself being formed by a plurality of distinct thicknesses. The laser marking sub-layer 20 can also be selected from among the films sold in a state ready to be laser-marked e.g. a film sold under the name Makrofol® ID 6-2 laserable by the company Bayer Materials Science, Leverkusen, Germany.

Each covering layer 21, 22 can be formed e.g. by a thermoplastic material, in particular selected from among polycarbonates, PVCs, polyesters (polyethylene terephthalate PET, polyethylene terephthalate glycol PETG), and co-extruded films of polyester and polycarbonate (PEC).

In the illustrated example, the basic layer 19 has imprinted inscriptions 23 (common and/or security details). The markings 13 with optically variable effect are imprinted in the form of patterns on the surface of the first covering layer 21 coming into contact with the laser marking sub-layer 20. However, these markings 13 with optically variable effect are imprinted in a precisely optically superimposed manner on patterns 24 of precisely identical forms imprinted on this same surface of the first covering layer 21 with an ink containing a marking agent which is sensitive to laser radiation.

These patterns 24 can be imprinted with an ink composition containing at least one agent absorbing the wavelength of the marking laser used. Such a marking agent which is sensitive to laser radiation can be selected in particular from the group comprising 95 nm nanonized carbon black sold under the name lamp black 101 by the company Degussa, Essen, Germany, the additives described in WO2004/50766 and WO2004/50767, the additives sold under the trade mark Micab® by the company DSM, Heerlen, Netherlands, the mica (silicate) particles covered with antimony-doped tin oxide as described in DE19522397, the additives sold under the trade mark IRIOTEC series 8000® by the company Merck, Dramstadt, Germany, a powder of calcined mixed oxides of co-precipitates of tin and antimony as described in US 6693657, the additives sold under the trade mark Markit® by the company BASF, Ludwigshafen, Germany, and the mixed oxides of copper or tin containing phosphorus which are described in WO2006/042714.

Very good results have been obtained with an ink containing nanonized carbon black (invisible in visible light) as sold under the name lamp black 101 and/or under the trade mark Flamrub® by the company Degussa, Essen, Germany, and with the additives sold under the trade mark IRIOTEC series 8000® by the company Merck, Dramstadt, Germany. Furthermore, the ink composition is selected to be compatible with the imprinting on the covering layer 21 and with the constituent material thereof, and with the hot rolling under pressure of the various constituent layers of the data medium 10.

Consequently, the patterns 24 are sensitive to marking laser radiation and are precisely optically superimposed on the marking patterns 13 with optically variable effect. With the example of FIG. 1, this means that the patterns 24 comprise a cloud, a sun and an undulating strip exactly of the same form as the markings 13a, 13b, 13c and optically superimposed thereon.

In the embodiment illustrated in FIG. 2, the patterns 24 which are sensitive to marking laser radiation are disposed above the markings 13 with optically variable effect, i.e. on the side of the outer surface 11. On the contrary, there is nothing to prevent the provision (variation not illustrated) for the patterns 24 which are sensitive to marking laser radiation to be disposed below the markings 13 with optically variable effect, i.e. on the side of the laser marking sub-layer 20.

In the example illustrated in FIG. 2, the second covering layer 22 comprises security markings 25 which can be imprinted on the surface of this second covering layer 22 coming into contact with the first covering layer 21. Other patterns and other markings can, of course, be incorporated into the data medium 10 at any suitable location.

The method for manufacturing the data medium of FIG. 2 comprises the following successive steps.

the inscriptions 23 are imprinted on the basic layer 19, the patterns 24 which are sensitive to laser radiation are imprinted on a surface of the first covering layer 21 with an ink composition comprising a marking agent which is sensitive to laser radiation, e.g. of the nanonized carbon black, the markings 13 with optically variable effect are imprinted in a superimposed manner on the patterns 24 on the same surface of the first covering layer 21 with at least one ink composition comprising pigments with optically variable effect, e.g. interferential pigments; in particular, each marking 13 can be formed of a polychromatic image as described in FR 2957554 (or sold under the trade marks OVTek® or Imagram® by the company Fasver, Baillargues, France), and is thus produced in a plurality of successive imprinting steps;

the security markings 25 are imprinted on the second covering layer 22;

the different layers 12, 19, 20, 21 and 22 are stacked one on another with the laser marking sub-layer 20 interposed between the basic layer 19 and the first covering layer 21, and are hot rolled under pressure in a rolling press, the total thickness of the stack decreasing by e.g. about 10%, to obtain the data medium as shown in FIG. 2, ready for use in order to undergo personalising marking by laser radiation.

FIG. 3 illustrates an example of personalising laser marking carried out on the data medium 10 of FIG. 1. In this example, the personalising laser marking comprise the texts "DUPONT", "JEANNE", "13081933" inscribed in the location 14, and a photograph inscribed in the location 15. The marking laser radiation can be provided by a 1064 nm Nd YAG laser of reference IXLA-XP24 sold by the company IXLA, Arry, Italy. Other examples are possible.

The marking 13b with optically variable effect in the form of a sun partially overlaps the location 14 formed by the laser marking sub-layer 20; the marking 13c with optically variable effect in the form of an undulating strip partially overlaps the location 15 formed by the laser marking sub-layer 20; the portion 16 without marking with optically variable effect also partially overlaps the locations 14, 15 formed by the laser marking sub-layer 20.

As shown in FIG. 4, in the portion 16 without marking with optically variable effect, the marking laser radiation produces markings 26 which extend only in the thickness of the laser marking sub-layer 20. In contrast, in the portion with optically variable effect of the outer surface 11, the marking laser radiation produces not only markings 27 which extend in the thickness of the laser marking sub-layer 20, but also markings 28 in the patterns 24 which are optically superimposed on the markings 13 with optically variable effect, these markings 28 being optically superimposed on the underlying markings 27. The result of this is that the various laser markings thus formed are homogeneous and visible with at least substantially the same contrast in their zone which is optically superimposed on a marking with optically variable effect and in their zone appertaining to the portion 16 without marking with optically variable effect, as illustrated schematically in FIG. 3.

FIGS. 5 and 6 illustrate another embodiment of the invention in which the markings 13 with optically variable effect are imprinted on the first covering layer 21 using an ink composition which incorporates a marking agent which is sensitive to laser radiation, e.g. nanonized carbon black. This embodiment makes it possible to avoid the two steps of imprinting the first embodiment. During application of the laser radiation, markings 29 are produced through the whole thickness of the markings 13 with optically variable effect, which are optically superimposed on the markings 27 produced by the laser radiation in the laser marking sub-layer 20.

FIGS. 7 and 8 illustrate a third embodiment of the invention which differs from the first embodiment by the fact that the patterns 24 incorporating at least one marking agent which is sensitive to laser radiation and the markings 13 with optically variable effect are not imprinted one on top of the other but, on the contrary, are imprinted on different surfaces, either on the two opposing surfaces of the first covering layer 21 or on a surface of the first covering layer 21 and on a surface of the second covering layer 22 respectively.

In the illustrated example, a first marking 13 with optically variable effect is interposed between the first covering layer 21 and the second covering layer 22, this first marking 13 being able to be produced by imprinting on the surface of the first covering layer 21 oriented towards the outer surface 11. This first marking 13 with optically variable effect is optically superimposed on a first pattern 24 imprinted on the surface of the first covering layer 21 oriented towards the laser marking sub-layer 20, this first pattern 24 thus being located interposed between the first covering layer 21 and the laser marking sub-layer 20. After application of the laser radiation, the markings 27 produced by the laser in the laser marking sub-layer 20 are optically superimposed on identical markings 30 produced in the thickness of said first pattern 24.

A second marking 13 with optically variable effect is interposed between the first covering layer 21 and the laser marking sub-layer 20, it being possible to produce this second marking 13 by imprinting on the surface of the first covering layer 21 oriented towards the laser marking sub-layer 20. This second marking 13 with optically variable effect is optically superimposed on a second pattern 24 imprinted on the surface of the first covering layer 21 oriented towards the outer surface 11, this second pattern 24 thus being located interposed between the first covering layer 21 and the second covering layer 22. After application of the laser radiation, the markings 27 produced by the laser in the laser marking sub-layer 20 are optically superimposed on identical markings 31 produced in the thickness of said second pattern 24.

Numerous other embodiments are possible. In particular, the patterns 24 incorporating at least one marking agent which is sensitive to laser radiation can be produced not strictly identical to the markings 13 with optically variable effect but only according to the parts of the markings 13 with optically variable effect which are superimposed on the underling laser marking sub-layer 20. In fact, in the parts of the markings 13 with optically variable effect which are not optically superimposed on the laser marking sub-layer 20 (or which are not intended to be optically superimposed on a laser marking), the presence of a marking agent which is sensitive to laser radiation is not necessary.

In other embodiments, not illustrated, it is possible to provide a covering layer entirely formed by imprinting as a block of colour using a composition comprising at least one marking agent which is sensitive to laser radiation, the proportion of marking agent sensitive to laser radiation being greater in the portion of the outer surface 11 with optically variable effect optically superimposed on the laser marking sub-layer 20 than in the portion 16 without marking with optically variable effect and optically superimposed on the laser marking sub-layer 20. In order to do this, it is possible e.g. to produce a plurality of successive impressions, one as a block of colour, the other in a pattern corresponding to the markings 13 with optically variable effect, at least in their part which is optically superimposed on the laser marking sub-layer 20. In these embodiments, the portion 16 without marking with optically variable effect thus also incorporates a certain proportion of marking agent which is sensitive to laser radiation, thus the products, under the effect of the laser radiation, of the markings optically superimposed on the markings produced in the laser marking sub-layer 20. Furthermore, it is possible to vary the proportion of marking agent which is sensitive to laser radiation and/or the nature of the marking agent which is sensitive to laser radiation in the patterns 24 which are optically superimposed on the laser marking sub-layer 20 depending on the nature and/or the density of the marking 13 with optically variable effect, in particular depending on the attenuation of the laser marking produced by the different markings 13 with optically variable effect.

In all the embodiments, the covering layers covering the laser marking sub-layer 20 must, at least in the locations 14, 15 intended to receive such markings, be transparent on the one hand to marking laser radiation (in particular in the infrared range, especially for a wavelength of 1064 nm), and must also be transparent to the wavelengths for observation of these markings, i.e. in the visible range for first level security or personalising markings intended to be seen by eye; or in the spectrum of excitation (photoluminescent markings) and observation of an optical reading device (e.g. in the visible range and/or in the ultraviolet range) if the markings are second or third level security markings.

The invention permits an improvement in the laser marking contrast by the presence of at least one marking agent which is sensitive to laser radiation in at least one covering layer 21, 22 in a zone which is optically superimposed on a marking 13 with optically variable effect and on at least one part of the laser marking sub-layer 20.

EXAMPLE

One of the surfaces of two sheets of polycarbonate 100 μm in thickness of the trade mark Makrofol® ID 6-2 laserable sold by the company Bayer Materials, Leverkusen, Germany is imprinted with patterns 24 using a varnish sold under the reference LG110606 by the company Tiflex, Poncin, France, containing 1% nanonized carbon black 95 nm sold under the name lamp black 101 by the company Degussa, Essen, Germany. This varnish is imprinted using a mesh size of 120 threads/cm.

Iridescent polychromatic images which are transparent in visible light, as described in FR2957554, are imprinted over these patterns 24 (in accordance with the first embodiment of FIGS. 2 and 3 described above), forming markings 13 with optically variable effect representing precisely the same signs as the patterns 24 previously imprinted (e.g. a cloud, a sun and an undulating strip as shown in FIG. 1).

Each iridescent polychromatic image is imprinted in window sticker form by successively screen printing two filtered monochromatic images. Each screen printing screen is produced from a fabric with a mesh size of 120 threads/cm, the threads being of a diameter of 34 μm.

A first imprinting composition is prepared comprising 20% by weight of a powder formed of particles of a blue interferential pigment (Xirallic® T60-21SW, galaxy blue, Merck Dramstadt, Germany) dispersed in a liquid imprinting medium (sold under the reference LG110606 by the company Tiflex, Poncin, France). A second imprinting composition is prepared in parallel comprising 20% by weight of a powder formed of particles of a green interferential pigment (Xirallic®, T60-24SW, stellar green, Merck Dramstadt, Germany) dispersed in the same imprinting liquid (LG110606 Tiflex, Poncin, France).

The polycarbonate sheets imprinted in this way are associated with three other polycarbonate sheets interposed between the imprinted polycarbonate sheets so as to form a stack, the imprinted surfaces being placed in contact with the underlying sheets of the stack, i.e. not constituting outer surfaces thereof. The five polycarbonate sheets forming, with the two imprinted sheets, said stack are successively the following: a sheet of 100 µm transparent polycarbonate; a sheet of 200 µm white polycarbonate; a sheet of 200 µm white polycarbonate; a sheet of 200 µm white polycarbonate, a sheet of 100 µm transparent polycarbonate.

The sheet assembly forming this stack is rolled in a rolling press under the following conditions:

1 min. rising to 180° C.
12 min. at 180° C. under 30 N/cm²
5 min. at 180° C. under 150 N/cm²
cooling to 26° C. for 17.5 min. under 180 N/cm².

A data medium 10 is obtained in the form of a card, the total thickness of which is equal to the sum of the thicknesses of the polycarbonate sheets used, decreased by about 10%.

Laser marking of a photograph and of a text is carried out, in part through the patterns 24 and the iridescent polychromatic images 13 as shown in FIG. 3, using a 1064 nm Nd YAG laser of reference IXLA-XP24 sold by the company IXLA, Arry, Italy.

The settings used are as follows:
For the photograph: speed 1250 mm/s; frequency 20 KHz; no power.
For the text: power: 25 W, speed: 1000 mm/s—frequency: 30 KHz.

A card is obtained constituting an official document; it is noted that the markings obtained under the effect of the laser radiation have substantially the same contrast through the iridescent images and in the portion without an iridescent image.

It goes without saying that the invention can cover numerous variant embodiments and applications other than those described above and illustrated in the figures. In particular, the laser radiation used for the marking can be different from laser radiation at 1064 nm. The covering layers covering the laser marking sub-layer can be of any number, down to 1. There can be numerous variations of the different markings.

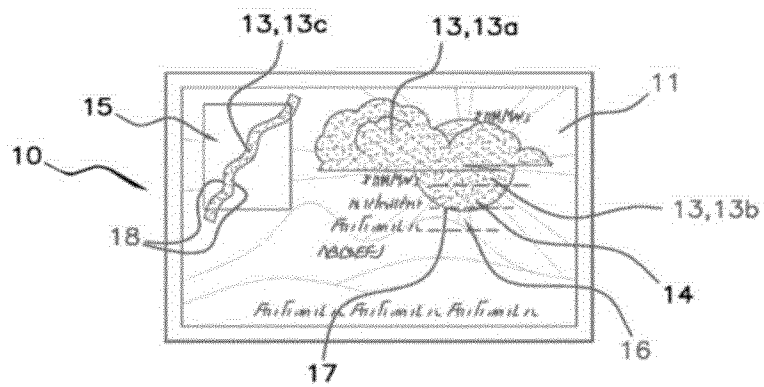

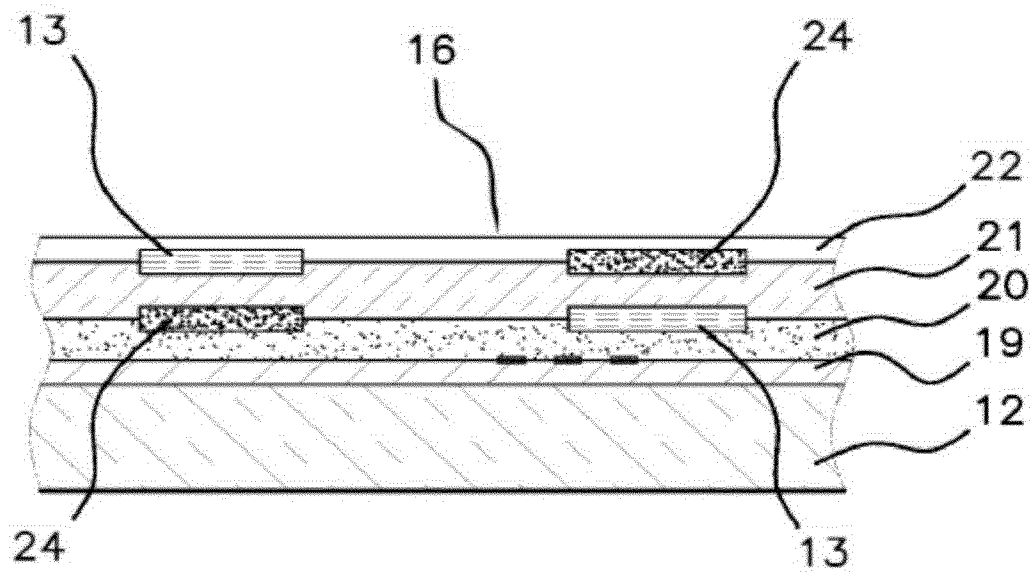
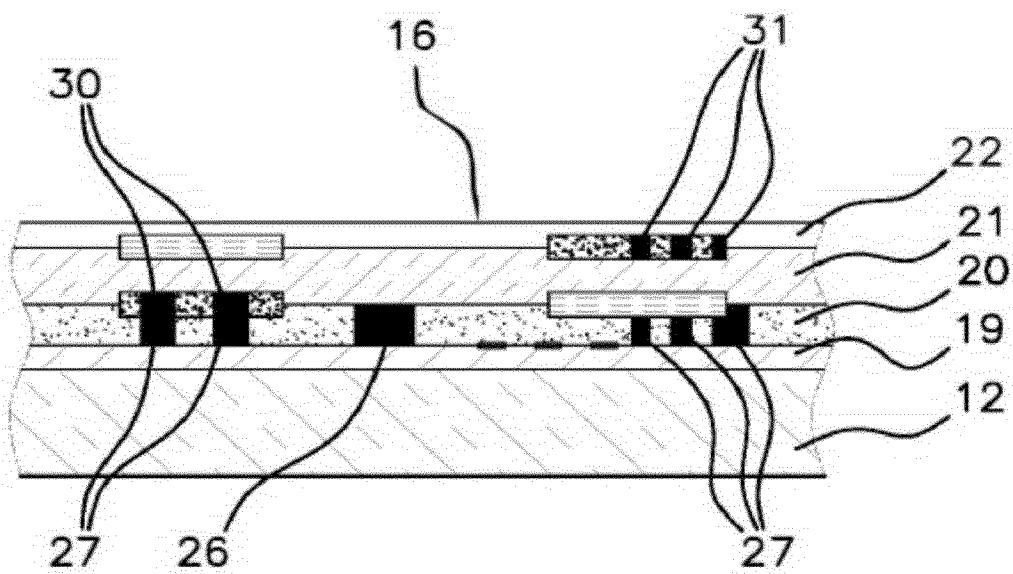

The invention claimed is:

1. A method for manufacturing a multi-layer data medium by hot rolling a stack of a plurality of superimposed layers under pressure, the stack of plurality of superimposed layers comprising at least one layer made of at least one thermoplastic material able to be marked by laser radiation applied to at least one outer surface of said data medium, the method comprising:
providing at least one covering layer which is transparent to marking laser radiation, the at least one covering layer extending between said outer surface and a laser marking sub-layer sensitive to the laser radiation so as to permit production of a marking in the marking sub-layer when the laser radiation passes through each covering layer;
incorporating at least one marking with an optically variable effect disposed with respect to the laser marking sub-layer so that said outer surface has a portion with optically variable effect optically superimposed on at least one part of the laser marking sub-layer and a portion without marking with optically variable effect optically superimposed on at least one part of the laser marking sub-layer, wherein
said at least one covering layer also incorporates at least one marking agent which is sensitive to said laser radiation so as to permit production of a marking in said at least one covering layer when subject to the laser radiation, and wherein said portion without marking with optically variable effect and said portion with optically variable effect are produced with at least one marking agent which is sensitive to said laser radiation, between said outer surface of the medium and said laser marking sub-layer, and
wherein said portion without marking with optically variable effect and said portion with optically variable effect are different from one another, and
wherein said portion without marking with optically variable effect is without any marking agent which is sensitive to said laser radiation, at least one marking agent which is sensitive to said laser radiation being incorporated into at least one covering layer only in said portion with optically variable effect.

2. The method according to claim 1, wherein each marking with optically variable effect is disposed with respect to the laser marking sub-layer so that said laser marking sub-layer extends facing at least one separation between the portion with optically variable effect and the portion without marking with optically variable effect.

3. The method according to claim 1, wherein said contents of at least one marking agent which is sensitive to said laser radiation are selected so that the laser marking obtained when subject to said laser radiation, as seen from said outer surface, is at least substantially homogeneous.

4. The method according to claim 1, wherein at least one covering layer incorporating at least one marking agent which is sensitive to said laser radiation and at least one covering layer comprising at least one marking with optically variable effect are optically superimposed.

5. The method according to claim 1, wherein at least one marking agent which is sensitive to said laser radiation is incorporated in at least one covering layer comprising at least one marking with optically variable effect.

6. The method according to claim 1, wherein each covering layer and the laser marking sub-layer are hot rolled under pressure after production of each marking with optically variable effect.

7. The method according to claim 2, wherein said contents of at least one marking agent which is sensitive to said laser radiation are selected so that the laser marking obtained when subject to said laser radiation, as seen from said outer surface, is at least substantially homogeneous.

8. The method according to claim 1, wherein at least one covering layer incorporating at least one marking agent which is sensitive to said laser radiation and at least one covering layer comprising at least one marking with optically variable effect are optically superimposed.

9. An official document comprising a multi-layer data medium comprising at least one layer made of at least one thermoplastic material, able to be marked when subject to laser radiation applied to at least one outer surface, comprising:
at least one covering layer
which is transparent to marking laser radiation,
said covering layer extending between said outer surface and placed covering a laser marking sub-layer, the laser marking sub-layer sensitive to laser radiation so as to permit production of a marking in the marking sub-layer by laser radiation through each covering layer,
the multi-layer data medium further including at least one marking with an optically variable effect disposed with respect to the laser marking sub-layer so that said outer surface has a portion with an optically variable effect optically superimposed on at least one part of the laser marking sub-layer and a portion without marking with the optically variable effect optically superimposed on at least one part of the laser marking sub-layer, wherein said at least one covering layer further includes at least one marking agent which is sensitive to said laser radiation so as to permit production of a marking in said at least one covering layer when subject to the laser radiation, said portion without marking with optically variable effect and said portion with optically variable effect have contents of at least one marking agent which is sensitive to said laser radiation, between said outer surface of the medium and said laser marking sub-layer, and wherein said portion without marking with optically variable effect and said portion with optically variable effect are different from one another, and wherein at least one outer surface has at least one laser marking, and wherein at least one laser marking is optically superimposed on at least one separation between at least one marking with optically variable effect and the portion without marking with optically variable effect, and wherein said laser marking is at least substantially homogeneous as seen from said outer surface.

10. A method for manufacturing a multi-layer data medium by hot rolling a stack of a plurality of superimposed layers under pressure, the stack of plurality of superimposed layers comprising at least one layer made of at least one thermoplastic material able to be marked by laser radiation applied to at least one outer surface of said data medium, the method comprising:

providing at least one covering layer which is transparent to marking laser radiation, the at least one covering layer extending between said outer surface and a laser marking sub-layer sensitive to the laser radiation so as to permit production of a marking in the marking sub-layer when the laser radiation passes through each covering layer;

incorporating at least one marking with an optically variable effect disposed with respect to the laser marking sub-layer so that said outer surface has a portion with optically variable effect optically superimposed on at least one part of the laser marking sub-layer and a portion without marking with optically variable effect optically superimposed on at least one part of the laser marking sub-layer, wherein said at least one covering layer also incorporates at least one marking agent which is sensitive to said laser radiation so as to permit production of a marking in said at least one covering layer when subject to the laser radiation, wherein said portion without marking with optically variable effect and said portion with optically variable effect are produced with at least one marking agent which is sensitive to said laser radiation, between said outer surface of the medium and said laser marking sub-layer, wherein said portion without marking with optically variable effect and said portion with optically variable effect are different from one another, wherein each marking with optically variable effect is disposed with respect to the laser marking sub-layer so that said laser marking sub-layer extends facing at least one separation between the portion with optically variable effect and the portion without marking with optically variable effect, and wherein said portion without marking with optically variable effect is without any marking agent which is sensitive to said laser radiation, at least one marking agent which is sensitive to said laser radiation being incorporated into at least one covering layer only in said portion with optically variable effect.

11. A method for manufacturing a multi-layer data medium by hot rolling a stack of a plurality of superimposed layers under pressure, the stack of plurality of superimposed layers comprising at least one layer made of at least one thermoplastic material able to be marked by laser radiation applied to at least one outer surface of said data medium, the method comprising:

providing at least one covering layer which is transparent to marking laser radiation, the at least one covering layer extending between said outer surface and a laser marking sub-layer sensitive to the laser radiation so as to permit production of a marking in the marking sub-layer when the laser radiation passes through each covering layer;

incorporating at least one marking with an optically variable effect disposed with respect to the laser marking sub-layer so that said outer surface has a portion with optically variable effect optically superimposed on at least one part of the laser marking sub-layer and a portion without marking with optically variable effect optically superimposed on at least one part of the laser marking sub-layer, wherein said at least one covering layer also incorporates at least one marking agent which is sensitive to said laser radiation so as to permit production of a marking in said at least one covering layer when subject to the laser radiation, wherein said portion without marking with optically variable effect and said portion with optically variable effect are produced with at least one marking agent which is sensitive to said laser radiation, between said outer surface of the medium and said laser marking sub-layer, wherein said portion without marking with optically variable effect and said portion with optically variable effect are different from one another, wherein said contents of at least one marking agent which is sensitive to said laser radiation are selected so that the laser marking obtained when subject to said laser radiation, as seen from said outer surface, is at least substantially homogeneous, wherein said portion without marking with optically variable effect is without any marking agent which is sensitive to said laser radiation, at least one marking agent which is sensitive to said laser radiation being incorporated into at least one covering layer only in said portion with optically variable effect.

* * * * *

UNITED STATES PATENT AND TRADEMARK OFFICE
CERTIFICATE OF CORRECTION

PATENT NO. : 10,357,990 B2
APPLICATION NO. : 15/314658
DATED : July 23, 2019
INVENTOR(S) : Eric Philippe et al.

It is certified that error appears in the above-identified patent and that said Letters Patent is hereby corrected as shown below:

On the Title Page

Item (72), under "Inventors", in Column 1, Line 1, delete "Eyguieres" and insert -- Eyguières --, therefor.

Delete the title page and substitute therefore with the attached title page consisting of the corrected illustrative figure(s).

In the Drawings

Please replace FIGS. 1-8 with FIGS. 1-8 as shown on the attached pages.

In the Specification

In Column 1, Line 45, delete "a official" and insert -- an official --, therefor.
In Column 2, Line 29, delete "2·10$^6$" and insert -- 2.10$^6$ --, therefor.
In Column 6, Line 62, delete "2·10$^6$" and insert -- 2.10$^6$ --, therefor.
In Column 8, Line 31, delete "polycarbonate (PEC)," and insert -- polyethylenecarbonate (PEC), --, therefor.
In Column 8, Line 60, delete "polycarbonate (PEC)," and insert -- polyethylenecarbonate (PEC), --, therefor.
In Column 10, Line 59, delete "polycarbonate (PEC)." and insert -- polyethylenecarbonate (PEC). --, therefor.
In Column 11, Line 56, delete "steps." and insert -- steps: --, therefor.
In Column 11, Line 61, delete "black," and insert -- black; --, therefor.

In the Claims

In Column 16, Line 53, in Claim 9, delete "layer" and insert -- layer, --, therefor.

Signed and Sealed this
Eighteenth Day of February, 2020

Andrei Iancu
*Director of the United States Patent and Trademark Office*

(12) United States Patent
Philippe et al.

(10) Patent No.: US 10,357,990 B2
(45) Date of Patent: Jul. 23, 2019

(54) METHOD FOR MANUFACTURING A MULTILAYER DATA MEDIUM WITH SECURITY MARKING WHICH CAN BE MARKED BY LASER

(71) Applicant: FASVER, Baillargues (FR)

(72) Inventors: Eric Philippe, Eyguieres (FR); Laurence Bes, Jacou (FR)

(73) Assignee: FASVER (FR)

( * ) Notice: Subject to any disclaimer, the term of this patent is extended or adjusted under 35 U.S.C. 154(b) by 44 days.

(21) Appl. No.: 15/314,658

(22) PCT Filed: Jun. 12, 2015

(86) PCT No.: PCT/EP2015/063201
§ 371 (c)(1),
(2) Date: Dec. 20, 2016

(87) PCT Pub. No.: WO2015/189404
PCT Pub. Date: Dec. 17, 2015

(65) Prior Publication Data
US 2017/0197452 A1   Jul. 13, 2017

(30) Foreign Application Priority Data
Jun. 13, 2014   (FR) .................... 14 55419

(51) Int. Cl.
*B42D 25/364* (2014.01)
*B41M 5/26* (2006.01)
(Continued)

(52) U.S. Cl.
CPC .......... *B42D 25/364* (2014.10); *B32B 27/08* (2013.01); *B32B 27/304* (2013.01); *B32B 27/36* (2013.01);
(Continued)

(58) Field of Classification Search
CPC .... B42D 25/364; B42D 25/46; B42D 25/455; B42D 25/41; B42D 25/351; B32B 27/304;
(Continued)

(56) References Cited

U.S. PATENT DOCUMENTS 5,304,789 A   4/1994   Lob et al.
5,928,780 A   7/1999   Schmidt et al.
(Continued)

FOREIGN PATENT DOCUMENTS

DE   195 22 397 A1   1/1997
EP    2 407 314 A1   1/2012
(Continued)

OTHER PUBLICATIONS

International Search Report, dated Aug. 18, 2015, from corresponding PCT application.

*Primary Examiner* — Justin V Lewis
(74) *Attorney, Agent, or Firm* — Levenfeld Pearlstein, LLC

(57) ABSTRACT

Disclosed is a method for manufacturing a multi-layer data medium by hot rolling under pressure, able to be marked under the effect of laser radiation applied to at least one outer surface (11) of this medium, in which at least one marking (13) with optically variable effect is disposed with respect to a laser marking sub-layer so that the outer surface (11) has a portion with optically variable effect optically superimposed on at least one part of the laser marking sub-layer and a portion (16) without marking with optically variable effect optically superimposed on at least one part of the laser marking sub-layer. These portions are produced with contents of at least one marking agent which is sensitive to the laser radiation which are different.

11 Claims, 4 Drawing Sheets